United States Patent Office 3,345,345
Patented Oct. 3, 1967

3,345,345
COMPOSITIONS CONTAINING HETEROCYCLIC COMPOUNDS AND RESINOUS PRODUCTS PREPARED THEREFROM
Roy T. Holm, Orinda, Calif., assignor to Shell Oil Company, New York, N.Y., a corporation of Delaware
No Drawing. Filed Oct. 15, 1962, Ser. No. 230,750
13 Claims. (Cl. 260—79.3)

This invention relates to new compositions of matter containing certain heterocyclic compounds and to resinous products prepared therefrom. More particularly, the invention provides new compositions containing compounds having a plurality of heterocyclic rings containing ethylenic groups, and to the resinous products obtained by heating the said compositions.

Specifically, the invention provides new and particularly useful compositions comprising a mixture of (1) a compound containing a plurality of groups comprising a cyclic structure containing an ethylenic group adjacent to a hetero atom, such as, for example, 3,4-dihydro-1,2-pyran-2-methyl 3,4-dihydro-1,2-pyran-2-carboxylate, and (2) a compound possessing an amino nitrogen attached to hydrogen and preferably an aromatic ring. The invention further provides valuable resinous products obtained by heating the above-described compositions.

As a special embodiment, the invention provides compositions particularly adapted for use in forming cured products having outstanding resistance to distortion by heat comprising a mixture of (1) the above-described compound containing a plurality of groups comprising a cyclic structure containing an ethylenic group adjacent to a hetero atom, and preferably a compound containing a plurality of dihydropyran rings, and (2) an aromatic polyamine, such as, for example, meta-phenylene diamine. These special compositions are particularly suited for use in making high temperaturre laminates, adhesives, moldings and surface coating compositions.

It is an object of the invention to provide a new class of compositions containing certain heterocyclic compounds and resinous products prepared therefrom. It is a further object to provide new compositions containing certain heterocyclic compounds which can be converted by heating to form useful and valuable resinous products. It is a further object to provide new compositions containing heterocyclic compounds which can be cured to form insoluble infusible products having excellent heat resistance. It is a further object to provide new compositions which are particularly suited for use in making high temperature laminates. It is a further object to provide new compositions containing heterocyclic compounds which are useful for preparation of high temperature adhesives, moldings and coating compositions. These and other objects of the invention will be apparent from the following detailed description thereof.

It has now been discovered that these and other objects may be accomplished by the new compositions of the invention comprising mixtures of (1) a compound containing a plurality of groups comprising a cyclic structure containing an ethylenic group adjacent to a hetero atom, such as, for example, 3,4-dihydro-1,2-pyran-2-methyl 3,4-dihydro-1,2-pyran-2-carboxylate, and (2) a compound possessing an amino nitrogen attached to hydrogen and preferably to an aromatic ring, such as, for example, meta-phenylene diamine. It has been unexpectedly found that when these special compositions are heated one obtains many useful and valuable resinous and polymeric type products. The products obtained by the use of the monoamine compounds, for example, are thermoplastic liquid to solid polymeric products which are useful as impregnating agents, additives for lubricating oils, high temperature lubricants, plasticizers, and the like. Those obtained by the use of the aromatic polyamines are crosslinked insoluble infusible products having many outstanding proper properties, and particularly outstanding resistance to distortion by heat. Cured products obtained in this manner, for example, have heat distortion points of the order of above 267° C. (end of measuring scale). Such products are suited for use in making high temperature laminates, moldings, adhesives, surface coatings and the like.

The heterocyclic compounds used in preparing the new compositions of the invention comprise those compounds possessing a plurality of cyclic structures containing an ethylenic group adjacent to a hetero atom. By hetero atom is meant a polyvalent atom other than carbon, such as, for example, oxygen, nitrogen, sulfur, phosphorus, arsenic, antimony, tin, lead, silicon and the like. Cyclic groups which contain both the hetero atom and the ethylenic group include, among others, the dihydropyran, tetrahydropyridine, thiophene, pyrrole, furan and the like rings and their substituted derivatives, such as, for example, their halogenated, alkylated, alkoxy-substituted derivatives and the like.

The group joining the above-described heterocyclic rings may be of any type of polyvalent connecting radical. Examples of these radicals include the simple inorganic or organic radicals such as bivalent hydrocarbon radicals or hydrocarbon radicals containing other elements such as oxygen, nitrogen, sulfur, phosphorous and the like, in the said radicals. The radicals may also be substituted with halogen atoms, ether, ester, mercaptan, urethane, amide, imide and the like radicals. The polyvalent connecting radicals may also be of a polymeric nature.

A preferred group of the above-described compounds may be exemplified by the following structural formula:

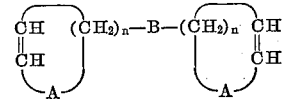

wherein A is a member of the group comprising oxygen, sulfur, nitrogen, phosphorous, arsenic, antimony, tin, lead, silicon and germanium, B is any organic or inorganic element or radical, n is an integer of at least 1.

A particularly preferred group of the heterocyclic compounds include those represented by the following structural formula:

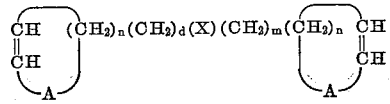

wherein A and n are as described above, d and m are 0 to 6 and X is a member of the group comprising hydrocarbon radicals, ether oxygen atom, sulfur atom, ester linkage, nitrogen atom, amide, imide, urethane linkage and the like.

Coming under special consideration, particularly because of the superior properties of the resulting cured products are the dihydropyran compounds of the formula:

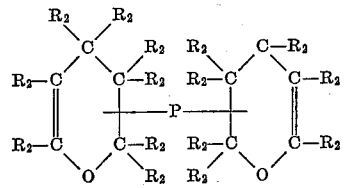

wherein $R_2$ is hydrogen, alkyl, alkoxy or halogen, P is a hydrocarbon radical or substituted hydrocarbon radical, such as one containing an ether oxygen, —S—, —SS—, ester, amide, imide, urethane, epoxide, or the like.

Examples of the above-described compounds include, among others, 3,4-dihydro-1,2-pyran-2-methyl 3,4-dihydro-1,2-pyran-2-carboxylate

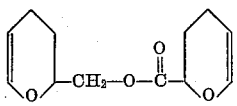

3,4-dihydro-1,2-pyran-2-methyl 2,3-dihydrothiophene-2-carboxylate

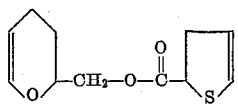

3,4-dihydro-1,2-pyran-2-methyl N-methyl-1,2,3,4-tetrahydropyridine-2-carboxylate

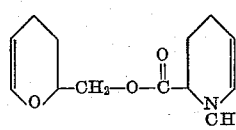

3,4-dihydro-1,2-pyran-2-methyl N-methyl-2,3-dihydropyrrole-2-carboxylate

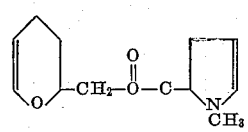

3,4-dihydro-1,2-pyran-2-methyl 2,3-dihydrofuran-2-carboxylate

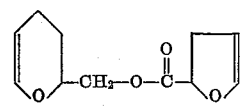

1,5-bis(3,4-dihydro-1,2-pyran-2-methoxy)pentane

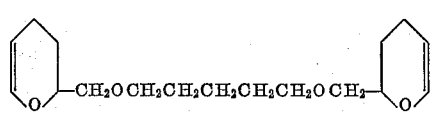

1,2,6-tris(3,4-dihydro-1,2-pyran-2-methoxy)hexane

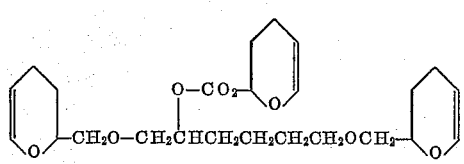

1,5-bis(3,4-dihydro-1,2-pyran-2-methylmercapto)pentane

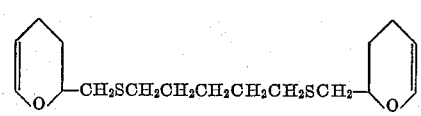

N-methyl-2,3-dihydropyrrole-2-methyl N-methyl-1,2,3,4-tetrahydropyridine-2-carboxylate

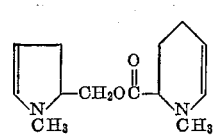

3,4-dihydro-2,5-dioctyl-1,2-pyran-2-butyl 3,4-dihydro-1,2-pyran-2-carboxylate

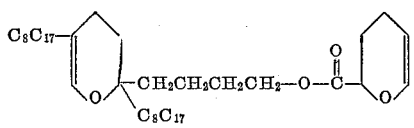

2,3-dihydrofuran-2-butyl-2-furoate

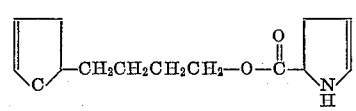

2,3-dihydrofuran-2-octyl 2,3-dihydrofuran-2-carboxylate

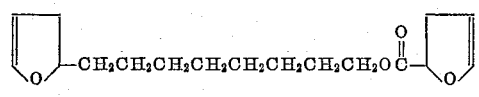

2,3-dihydrofuran-2-hexyl 2,3-dihydrothiophene-2-carboxylate

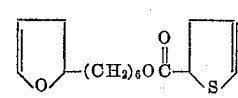

Other examples include compounds of the formulae:

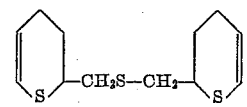

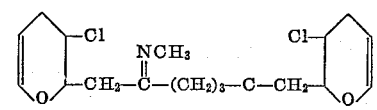

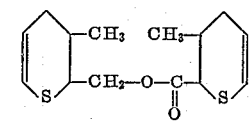

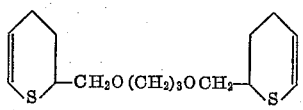

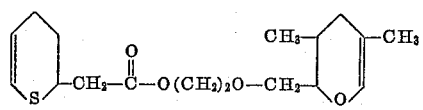

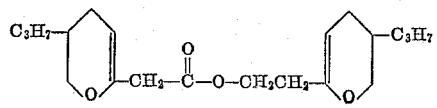

Other examples include compounds having more than 2 heterocyclic rings, such as

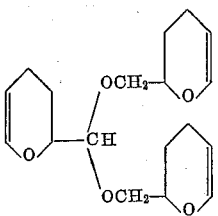

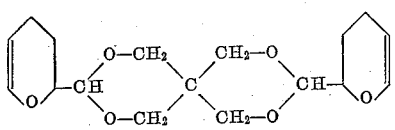

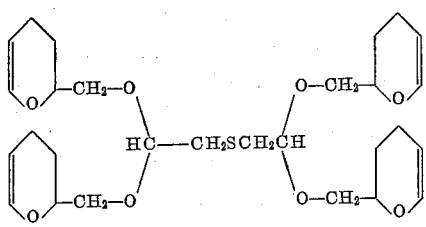

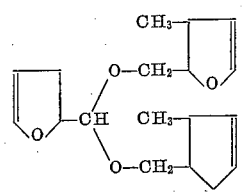

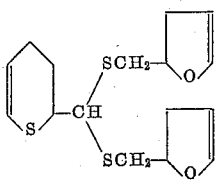

A valuable group of the diluents include those of the formula

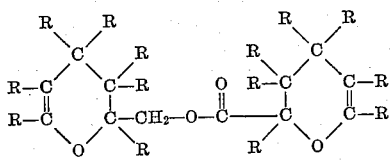

in which each R represents hydrogen or a hydrocarbon radical (and preferably an alkyl group). Examples of these compounds include, among others, 3,4-dihydro-1,2-pyran-2-methyl 3,4-dihydropyran-2-carboxylate, 4-butyl-3,4-dihydro-1,2-pyran-2-methyl 3,4-dihydropyran-2-carboxylate, 3,4-diethyl-3,4-dihydro-1,2-pyran-2-methyl 3,4-dihydropyran-2-carboxylate, 3,4-diisopropyl-3,4-dihydropyran-2-methyl 3,4-diisopropyl-3,4-dihydropyran-2-1,2-pyran-2-methyl 3,4-diisopropyl-3,4-dihydropyran-2-carboxylate, 4-hexyl-3,4-dihydro-1,2-pyran-2-methyl 3,4-diisopropyl-3,4-dihydropyran-2 - carboxylate, 4,5-di-tert-butyl-3,4-dihydropyran-2-methyl 4-hexyl - 3,4 - dihydropyran-2-carboxylate, 4,6-dioctyl - 3,4 - dihydropyran-2-methyl 4-octyl-3,4-dihydropyran - 2 - carboxylate, 2,5-didodecyl-3,4-dihydropyran -2- methyl 4-octyl-3,4-dihydropyran-2-carboxylate.

The above-described compounds can be prepared by a variety of different methods. The esters of the heterocyclic acids and heterocyclic alcohols can, for example, be prepared by reacting a salt of the acid with a halide corresponding to the heterocyclic alcohol. The ethers can be obtained by reacting the alcohol with a halide corresponding to the heterocyclic acid in the presence of a suitable catalyst. The amides may be prepared by reacting the heterocyclic amine with the desired heterocyclic acid in the presence of conventional catalyst. Alternatively the esters may be prepared by reacting aldehyde, such as the 3,4-dihydro-1,2-pyran 2-carboxaldehyde with the catalyst, such as aluminum isopropoxide, so as to effect a Tischenko reaction and formation of an ester group between two molecules of the aldehyde. This latter method is described in U.S. 2,537,921.

The other component to be used in making the compositions of the present invention comprise the organic compounds possessing an amino nitrogen attached to hydrogen and preferably to an aromatic ring. These compounds may possess one or more amino nitrogen and one or more amino hydrogen. They may be substituted with other substituents, such as halogen atoms, alkoxy groups, ester groups, ether groups, alkenyl groups, and the like, and may be monomeric or polymeric.

Examples of the above-described compounds include, among others, the aromatic mono- and polyamines, such as aniline, n-ethyl aniline, p-chloroaniline, tert-butyl-aniline, p-hydroxyaniline, naphthylamine, diphenyl amine, ortho-, meta-, and para-phenylene diamine, diaminodiphenylmethane, p,p' - diaminodiphenylsulfone, triaminobenzene, diaminotoluene, diamino-diphenyl, 1,3-diamino-4-isopropylbenzene, 1,3-diamino-4,5-diethylbenzene, diaminostilbene and the like, and aliphatic and cycloaliphatic amines, such as, for example, ethylene diamine,
diethylene triamine,
triethylene tetramine,
tetraethylene pentamine,
1,4-aminobutane,
1,3-diaminocyclohexane,
1-cyclohexylamino-3-aminopropane,
1,4-diaminocyclohexane,
1,3-diaminocycloheptane,
di(aminocyclohexyl)methane,
di(aminocyclohexyl)sulfone,
1,3-di(aminocyclohexyl)propane,
2,4-diaminocyclohexane,
4-isopropyl-1,2-diaminocyclohexane,
1,4-diaminomethylcyclohexane,
di(hexamethylene)triamine,
meta-xylylene diamine,
N,N'-diethyl-1,3-propanediamine,
hexapropylene heptamine,
tetrabutylenepentamine,
hexa(1,1-dimethylethylene)-heptamine,
pentaamylhexamine,
tetra(1,3-dimethylpropylene)pentamine, and
N,N'-dibutyl-1,6-hexanediamine.

Preferred amines include the polyamines, such as the aliphatic amines of the formula $H_2N(RNH)_nH$ wherein R is an alkylene radical, preferably of 2 to 4 carbon atoms and $n$ is an integer of at least 1; polyamines having at least one amino or alkyl-substituted amino group attached directly to a cycloaliphatic ring containing from 5 to 7 carbon atoms; aminoalkyl-substituted aromatic compounds containing up to 20 carbon atoms; and N-(aminoalkyl) piperazines.

Other preferred amines include adducts of polyamines and monoepoxides, such as adducts of alkylene oxides and any of the above-described polyamines. Others include the soluble adducts of polyepoxides and monoamines, such as adducts of diglycidyl ether and dimethylamines. Still other examples include the adducts of polyamines and unsaturated nitriles, such as acrylonitrile.

Particularly preferred amines include those of the formulae $$X(NH_2)_n \text{ and } (NH_2)_m X—R—X(NH_2)_m$$

wherein X is a polyvalent aromatic hydrocarbon radical, preferably containing from 6 to 12 carbon atoms, R is a bivalent aliphatic hydrocarbon radical, preferably containing 1 to 6 carbon atoms, $n$ is an integer of at least 2, and preferably 2 to 4, and $m$ is an integer of at least 1, and preferably 1 to 3.

Mixtures of aromatic polyamines may also be used, and in some cases it may be desirable to use such mixtures. Thus, mixtures of normally solid diamines, or of a normally solid and a normally liquid diamine, may be prepared in such proportions that they are liquid at the normal working temperatures. Eutectic mixtures are advantageous on occasions. For example, a mixture of about 70 to 80% meta-phenylene diamine and 20 to 30% orthophenylene diamine has a melting point of only about 43° C. and is particularly useful for this reason. Other desirable eutectics include the mixture of meta-phenylene diamine and meta-aminophenol containing about 63% of the former which melts at about 24° C. and the mixture of meta-phenylene diamine and meta-dinitrobenzene, containing about 55% of the former and melts at 37° C. Mixtures of meta-phenylene diamine and p,p'-diaminodiphenylmethane (p,p'-methylene dianiline) in weight ratios between about 40:60 and 80:20 are especially desirable. A eutectic mixture of from 60 to 70% meta-phenylene diamine and 40 to 30% p,p'-diaminodiphenylmethane is a stable liquid for 5 to 6 days at 20 to 30° C. after preparation. More complex eutectic mixtures containing meta-phenylene diamine and two or more other substances may also be used.

Other examples include the polymeric amines, such as may be obtained by homopolymerizing and copolymerizing allylic aromatic amines or by reaction of aromatic polyamines with polymers such as acrylic ester copolymers. Still other examples include adducts formed by reaction of polyamines with monoepoxides, such as described and claimed in U.S. 2,938,004, or by the reverse reaction of reacting mono-aromatic amines with polyepoxides. Still others include the adducts obtained by reaction of aromatic polyamines with unsaturated nitriles, such as acrylonitrile. Preferred species of these cyanoalkylated aromatic polyamines include those of the formula

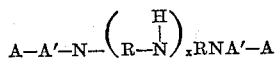

wherein $x$ represents an integer in the range of 0 through 3, A and A' represent hydrogen and cyanoethyl radicals and R represents the residue of the aromatic polyamine.

Still other examples include the imidazolines obtained by reacting monocarboxylic acids with aromatic polyamines, as well as the adducts obtained by reacting aromatic polyamines with acrylates, such as methyl acrylate and ethyl acrylate.

The compositions of the invention may be prepared by any suitable method. If both of the two components are liquids, the compositions may be simply prepared by mixing the two together. If one or more of the components is a thick liquid or solid, it is generally preferred to combine the components in a suitable solvent or diluent. Various solvents or diluents which will evaporate before or during heating at cure are generally preferred.

The ratio of the heterocyclic compound and the amine employed in the composition will vary within certain limits depending upon the properties desired in the resulting products. Compositions having desired properties are obtained when the amine is employed in a chemical equivalent amount varying preferably from about .8 to 1.5 per equivalent of heterocyclic compound. As used herein chemical equivalent amounts refers to that amount needed to furnish 1 amino hydrogen per ethylenic group adjacent to the heteroatom.

Other materials, such as fillers, dyes, plasticizers, stabilizers and the like may be added as desired along with suitable other resinous materials, such as vinyl resins, tars, pitches, distillate oils, alkyd resins and the like.

The resinification of the above-described compositions may be accomplished by merely heating the above-described composition. Temperatures employed will vary from about 90° C. to as high as or higher than 250° C.

Accelerators or catalysts can be added to accelerate the resinification. This includes acidic-type accelerators, such as amine hydrochlorides, stannous chloride, ferrous chloride, and the like. Such materials are employed in minor amounts, such as, for example, 0.01% to 5% by weight of the amine.

The compositions of the invention may be utilized for a variety of applications. The compositions are ideally suited for use in preparing coating compositions, impregnating and sealing compositions, foams, pottings, castings, adhesives, and the like.

When used for coating compositions the new compositions of the invention may be used as such or mixed with various additives such as plasticizers, stabilizers, and extenders such as oils, resins, tars, pitches, distillates, and the like, and then spread out as a film and baked at the desired temperature.

The products of the invention may also be used in preparing pottings and castings for electrical apparatus. In actual practice, the compositions are generally combined with the desired fillers, plasticizers, etc., and the mixture poured into the mold or casting containing the electrical apparatus, such as electrical motors and the like, and the mixture heated to the desired temperature.

The resinous products may also be employed to prepare valuable foamed products. In this application the resinous products of the invention are preferably combined with the desired foaming agents and others, such as thixotropic agents, pigments, stabilizing agents, and the like that may be desired. This mixture may be foamed and cured by applying heat.

The products of the invention may also be employed to prepare adhesives and impregnating compositions. In utilizing the products for these applications it is generally desirable to combine them with the desired diluent such as acrylonitrile, acetonitrile, crotononitrile, and desired fillers and stabilizers and then apply this mixture to the desired surface. Adhesive compositions prepared in this manner may be used to unite various surfaces such as wood-to-wood, metal-to-metal, resin-to-resin, and the like. The adhesive may be allowed to set at room temperature or heat may be applied to hasten the cure.

The compositions of the invention are also particularly useful and valuable in the preparation of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton batts, duch muslin, canvas and the like.

In preparing the laminate, the sheets of fibrous material are first impregnated with the composition of the invention. This may be accomplished by the use of compositions as such or by a solvent solution thereof. The impregnation of the sheets can be accomplished by any suitable method. The sheets may be impregnated, for example, by spreading or pouring the material onto the sheets and pressing the material down into the fibers by use of layers of cellophane or by the use of a doctor blade. The sheets may be impregnated also by dipping or otherwise immersing them in the impregnant. The solvent if any may be allowed to evaporate and the composition cured by the application of heat. The sheets may be cured singly or as an assembly of superimposed sheets.

The curing is preferably accomplished at temperatures ranging from about 80° C. to 200° C. and a pressure of about 25 to 500 or more pounds per square inch. The resulting laminates are hard and tough and have excellent resistance to deformation at high temperatures.

To illustrate the manner in which the invention may be carried out, the following examples are given. It is to be understood, however, that the examples are for the purpose of illustration and the invention is not to be regarded as limited to any of the specific conditions recited therein.

*Example I*

This example illustrates the preparation and use of a composition containing 3,4-dihydro-1,2-pyran-2-methyl-3,4-dihydro-1,2-pyran-2-carboxylate and meta-phenylene diamine.

100 parts of 3,4-dihydro-1,2-pyran-2-methyl 3,4-dihydro-1,2-pyran-2-carboxylate was mixed with 24.1 parts of meta-phenylene diamine and the mixture heated for 40 hours at 150° C. The resulting product was a hard insoluble infusible casting having a heat distortion point greater than 267° C.

*Example II*

This example illustrates the use of the composition shown in Example I for the preparation of a multi-layer laminate.

The composition shown in Example I made up of 24.1 parts of metaphenylene diamine and 100 parts of 3,4-dihydro-1,2-pyran-2-methyl 3,4 - dihydro-1,2-pyran-2-carboxylate was poured on the top of the above-noted laminated structure, a layer of cellophane placed on top, and the cellophane pressed down so as to force the mixture into the laminated structure. The mixture of resin gradually spread throughout the structure. The laminate was then cured for 12 minutes at contact pressure and 100° C. followed by 48 minutes at 110° C. and 25 p.s.i. Strips of the laminate were then post cured for 40 hours at 350° F. The resulting product was tested for strength and resistance to water. The product has excellent strength and good water resistance.

*Example III*

This example illustrates the preparation and use of a composition containing dimethyl di(3,4 - dihydro-1,2-pyran-2-methoxy) silane and meta-phenylene diamine.

142 parts of dimethyl di(3,4-pyran-2-methoxy) silane was mixed with 27 parts of meta-phenylene diamine. The mixture is heated to 150° C. for 24 hours. The resulting product is a hard insoluble infusible product having good resistance to heat.

*Example IV*

This example illustrates the preparation and use of a composition containing tri(3,4 - dihydroxy-1,2-pyran-2-methyl) phosphate and meta-phenylene diamine.

129 parts of the above-described phosphate was combined with 27 parts of meta-phenylene diamine and the mixture heated to 150° C. for 24 hours. The resulting product is a hard insoluble, infusible product having good resistance to heat.

*Example V*

This example illustrates the preparation and use of a composition containing di(3,4-pyran-2-methyl) ether and methylene dianiline.

120 parts of di(3,4-dihydro-1,2-pyran-2-methyl) ether is mixed with 50 parts of methylene dianiline. The resulting mixture which is quite fluid is heated for 24 hours at 150° C. The resulting product is hard insoluble, infusible casting having a high heat distortion point.

*Example VI*

This example illustrates the preparation and use of a composition containing dimethyl bis(3,4-dihydro-1,2-pyran-2-methoxy) silane and diaminodiphenylsulfone.

142 parts of dimethyl bis(3,4-dihydro-1,2-pyran-2-methoxy) silane is mixed with 62 parts of diaminodiphenylsulfone. The resulting mixture is then heated for 24 hours at 150° C. The resulting product is a hard insoluble, infusible casting having a high heat distortion point.

*Example VI*

This example illustrates the preparation and use of a composition containing 2,3-dihydrofuran-2-methyl-2-furoate and methylene dianiline.

103 parts of 2,3-dihydrofuran-2-methyl 2-furoate is mixed with 50 parts of methylene dianiline and the resulting mixture heated at 150° C. for 24 hours. The resulting product is a hard insoluble, infusible casting having a high heat distortion point.

*Example VIII*

100 parts of 3,4-dihydro-1,2-pyran-2-methyl 3,4-dihydro-1,2-pyran-2-carboxylate was combined with 26 parts of triethylene tetramine and the mixture heated at 150° C. for 24 hours. The resulting product was a hard casting.

*Example IX*

100 parts of 3,4-dihydro-1,2-pyran-2-methyl 3,4-dihydro-1,2-pyran-2-carboxylate was combined with 31 parts of 1,3-diaminocyclohexane and the mixture heated for 24 hours at 150° C. The resulting product was a hard casting.

*Example X*

100 parts of 3,4-dihydro-1,2-pyran-2-methyl 3,4-dihydro-1,2-pyran-2-carboxylate was combined with 38 parts of 1,4-diaminomethylcyclohexane and the mixture heated at 150° C. The resulting product is a hard tough casting.

*Example XI*

100 parts of 3,4-dihydro-1,2-pyran-2-methyl 3,4-dihydro-1,2-pyran-2-carboxylate was combined with 46 parts of di(hexamethylene)triamine and the mixture heated at 150° C. The mixture set up to a hard casting.

*Example XII*

Examples VIII to XI are repeated with the exception that the 3,4-dihydro-1,2-pyran-2-methyl 3,4-dihydro-1,2-pyran-2-carboxylate is replaced with each of the following: dimethyl di(3,4-dihydro-1,2-pyran-2-methoxy)silane, tri(3,4-dihydroxy-1,2-pyran-2-methyl) phosphate, di(3,4-pyran-2-methyl)ether. Related results are obtained in each case.

*Example XIII*

100 parts of 3,4-dihydro-21, 3-pyran-2-methyl 3,4-dihydro-1,2-pyran-2-carboxylate is combined with 50 parts of metaxylylene diamine and the mixture heated at 150° C. The mixture sets up to hard tough casting.

*Example XIV*

Examples I to II are repeated with the exception the pyran compound is replaced with each of the following: N-methyl-2,3-dihydropyrrole - 2 - methyl N-methyl-1,2,3,4-tertrahydropyridine - 2 - carboxylate; 3,4-dihydro-1,2-pyran - 2 - methyl N-methyl-1,2,3,4-tetrahydropyridine-2-carboxylate; 3,4-dihydro - 1,2 - pyran-2-methyl 2,3-dihydrothiophene - 2 - carboxylate and 3,4-dihydro-1,2-pyran-2-methyl 2,3-dihydrofuran - 2 - carboxylate. Related results are obtained.

I claim as my invention:

1. A heat curable composition comprising a mixture of (1) a compound of the formula $$\underset{A}{\underset{HC}{\overset{HC}{\Big(}}} (CH_2)_n - B - (CH_2)_n \underset{A}{\underset{CH}{\overset{CH}{\Big)}}}$$

wherein A is a member of the group consisting of oxygen, sulfur and nitrogen, B is a member of the group consisting of a hydrocarbon radical and hydrocarbon radicals substituted with an ether oxygen atom

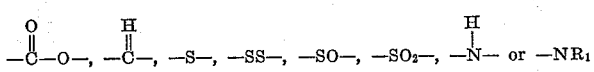

(wherein $R_1$ is hydrocarbon), $n$ is 1 to 3, and (2) a polyamine wherein the amino nitrogen is attached to hydrogen and to an aromatic ring.

2. A heat curable composition comprising a mixture of (1) a compound of the formula

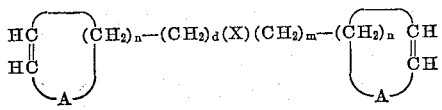

wherein A is a member of the group consisting of oxygen, sulfur and nitrogen, X is a member of the group consisting of hydrocarbon radicals, ether oxygen atoms,

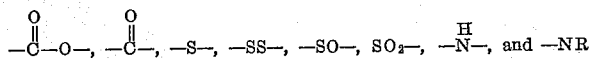

(wherein R is hydrocarbon), $n$ is 1 to 3, $d$ and $m$ are integers of 0 to 1 and (2) an aromatic polyamine wherein the amino nitrogen is attached to hydrogen and to an aromatic ring.

3. A heat curable composition comprising a mixture of (1) a dihydropyran compound of the structure

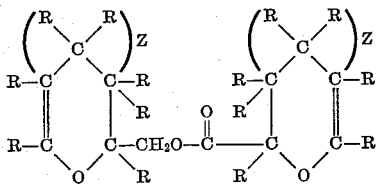

wherein R is a member of the group consisting of hydrogen and alkyl radicals and Z is an integer of 0 to 1, and (2) an aromatic polyamine wherein the amino nitrogen is attached to hydrogen and to an aromatic ring.

4. A heat curable composition as in claim 3 wherein the polyamine is one having a formula $$X(NH_2)_n \text{ or } (NH_2)_m XRX(NH_2)_m$$

wherein X is a polyvalent aromatic hydrocarbon radical, $n$ is an integer of 2 to 4 and $m$ is an integer of 1 to 3.

5. A heat curable composition comprising a mixture of (1) 3,4-dihydro-1,2-pyran-2-methyl 3,4-dihydro-1,2-pyran-2-carboxylate, and (2) an aromatic polyamine wherein the amino nitrogen is attached to hydrogen and to an aromatic ring.

6. A heat curable composition comprising a mixture of (1) 2,3-dihydrofuran-2-methyl 2,3-dihydrofurancarboxylate, and (2) an aromatic polyamine wherein the amino nitrogen is attached to hydrogen and to an aromatic ring.

7. A heat curable composition comprising a mixture of (1) bis(3,4-dihydro-1,2-pyran-2-methyl) ether, and (2) meta-phenylene diamine.

8. A heat curable composition comprising a mixture of (1) 3,4-dihydro-1,2-pyran-2-methyl 3,4-dihydro-1,2-pyran-2-carboxylate, and (2) meta-phenylene diamine.

9. A heat curable composition comprising a mixture of (1) 3,4-dihydro-1,2-pyran-2-methyl 3,4-dihydro-1,2-pyran-2-carboxylate, and (2) p,p'-methylene dianiline.

10. A hard insoluble, infusible product obtained by heating the composition defined in claim 1.

11. A hard insoluble, infusible product obtained by heating the composition in claim 2.

12. A hard insoluble, infusible product obtained by heating the composition defined in claim 5.

13. A hard insoluble, infusible product obtained by heating the composition defined in claim 8.

References Cited
UNITED STATES PATENTS

| | | | |
|---|---|---|---|
| 2,537,921 | 1/1951 | Smith | 260—86.1 |
| 3,116,301 | 12/1963 | Williams et al. | 260—2 |
| 3,128,255 | 4/1964 | McGray et al. | 260—2 |

OTHER REFERENCES

Chemical Abstracts, vol 57, p. 11387a.

JOSEPH L. SCHOFER, *Primary Examiner.*

LEON J. BERCOVITZ, *Examiner.*

C. R. REAP, L. WOLF, H. WONG, Jr.,
*Assistant Examiners.*